No. 755,733. PATENTED MAR. 29, 1904.
T. BARROW.
MOTOR.
APPLICATION FILED JAN. 3, 1903.
NO MODEL. 4 SHEETS—SHEET 1.

WITNESSES:
Charles Hanimann
Samuel L. Sargent

INVENTOR
Thomas Barrow
BY
Chas. N. Forbes
ATTORNEY

No. 755,733. PATENTED MAR. 29, 1904.
T. BARROW.
MOTOR.
APPLICATION FILED JAN. 8, 1903.
NO MODEL. 4 SHEETS—SHEET 2.

Witnesses
Charles Hanimann
Samuel L. Sargent.

Thomas Barrow
Inventor
By his Attorney

No. 755,733. PATENTED MAR. 29, 1904.
T. BARROW.
MOTOR.
APPLICATION FILED JAN. 8, 1903.
NO MODEL. 4 SHEETS—SHEET 3.

Witnesses
Charles Harimann
Samuel L. Sargent.

Thomas Barrow
Inventor
By his Attorney
Chas N. Forbes

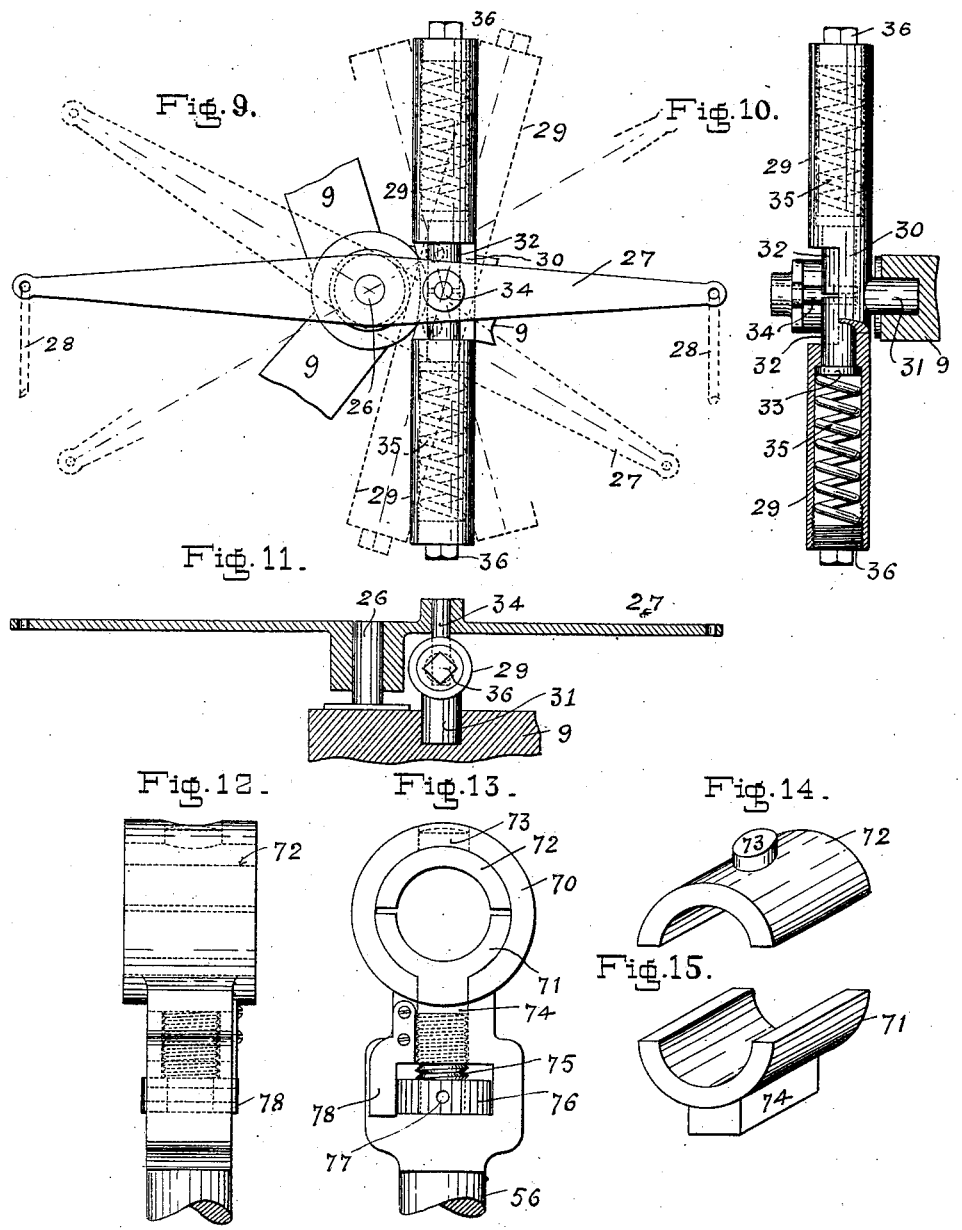

No. 755,733.

Patented March 29, 1904.

UNITED STATES PATENT OFFICE.

THOMAS BARROW, OF PLAINFIELD, NEW JERSEY, ASSIGNOR TO PEDRICK AND AYER COMPANY, OF PLAINFIELD, NEW JERSEY.

MOTOR.

SPECIFICATION forming part of Letters Patent No. 755,733, dated March 29, 1904.

Application filed January 8, 1903. Serial No. 138,191. (No model.)

*To all whom it may concern:*

Be it known that I, THOMAS BARROW, a subject of the King of Great Britain, and a resident of Plainfield, in the county of Union and State of New Jersey, have invented certain new and useful Improvements in Motors, of which the following is a specification.

This invention relates to new and useful improvements in motors designed to be operated by compressed air or other fluid.

The invention further consists in certain improvements in the devices for operating the valve controlling the motive fluid, all as hereinafter particularly referred to.

The present invention is more particularly adapted for stationary use, but may be rendered portable; and the object of the invention is to produce a simple and compact machine of this class having all its operative parts inclosed within the casing, and in which there will be a minimum amount of friction in working, and in which every part is accessible and may be readily replaced, and in which the wear may be readily taken up, and in which any determinate number of cylinders required by the load may be used. The construction and relative arrangement of the operative parts comprise, with the casing, a surrounding annular rotating gear, a central shaft to which such gear is secured, pinions journaled in the casing and deriving movement through the medium of cranks operated from pistons and oscillating cylinders journaled at the end on tapered valves, which act as admission and exhaust valves, a suitable controlling and reversing valve being provided in the center of the casing and having passage-ways communicating with the valves leading to the respective cylinders, the parts in detail being hereinafter more particularly explained.

In the accompanying drawings, forming a part of this specification, a motor is illustrated embodying my invention and involving its principle of operation, which I will first proceed to describe and subsequently will point out in the appended claim its novel characteristics.

Figure 1:
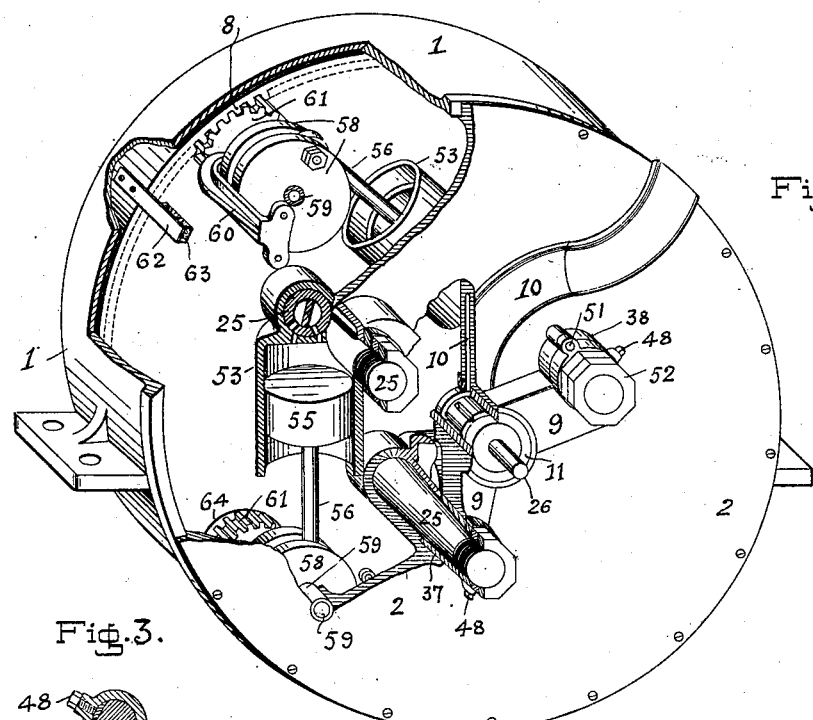
Figure 3:
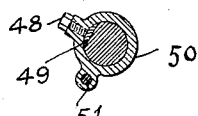
Figure 2:
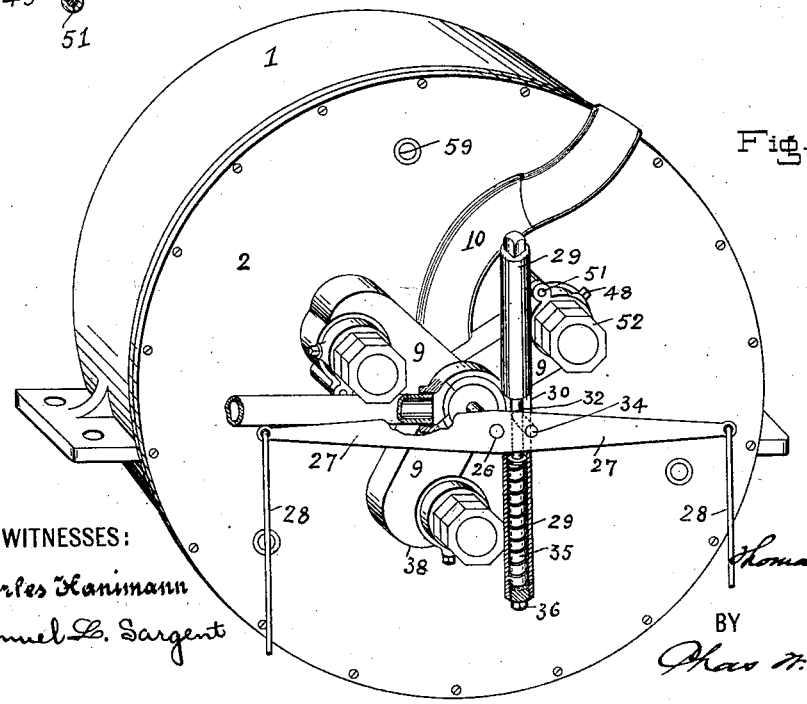
Figure 4:
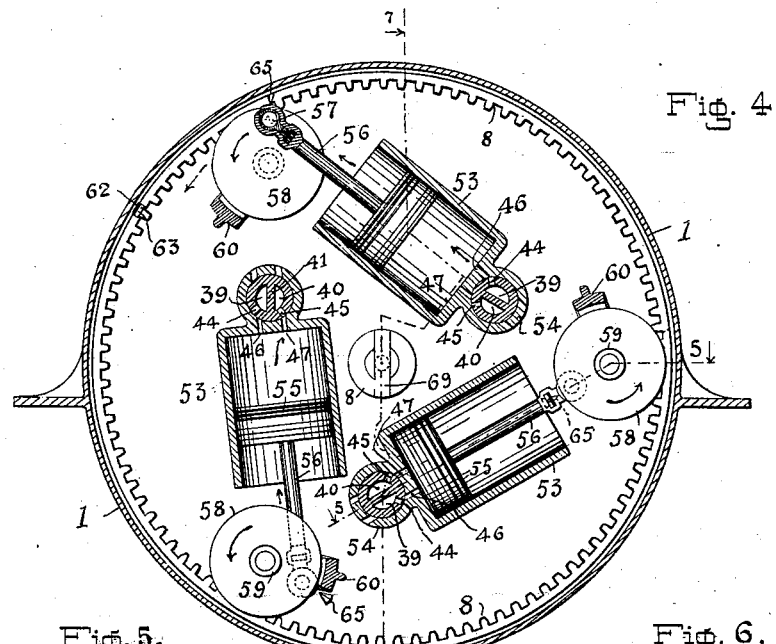
Figure 5:
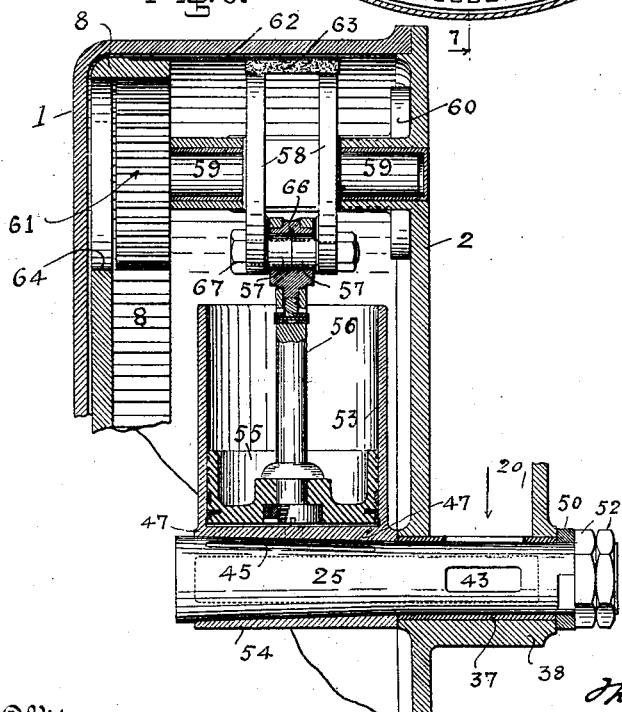
Figure 6:
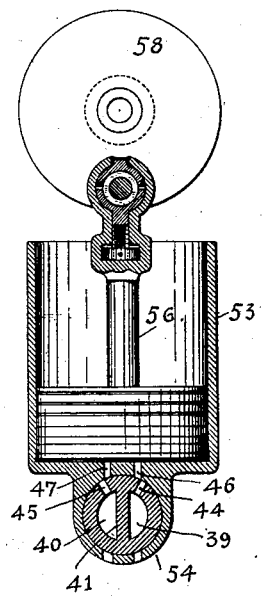
Figure 7:
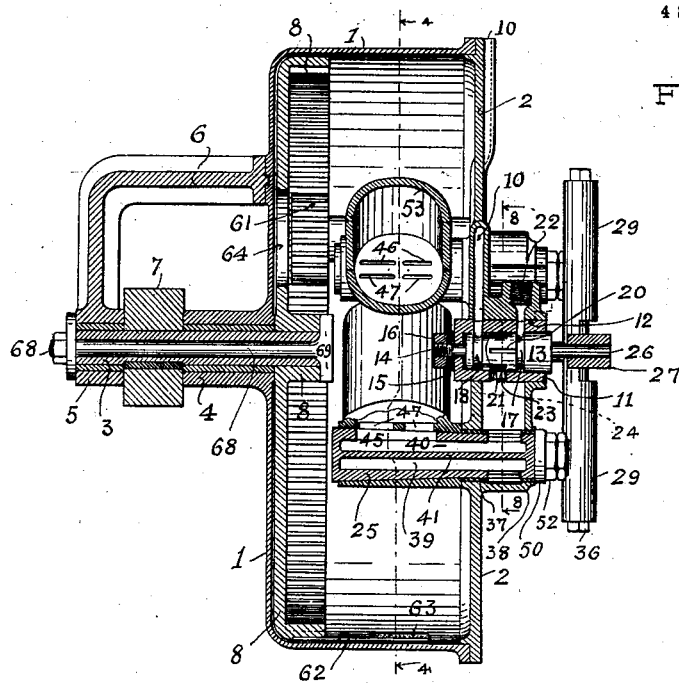
Figure 8:
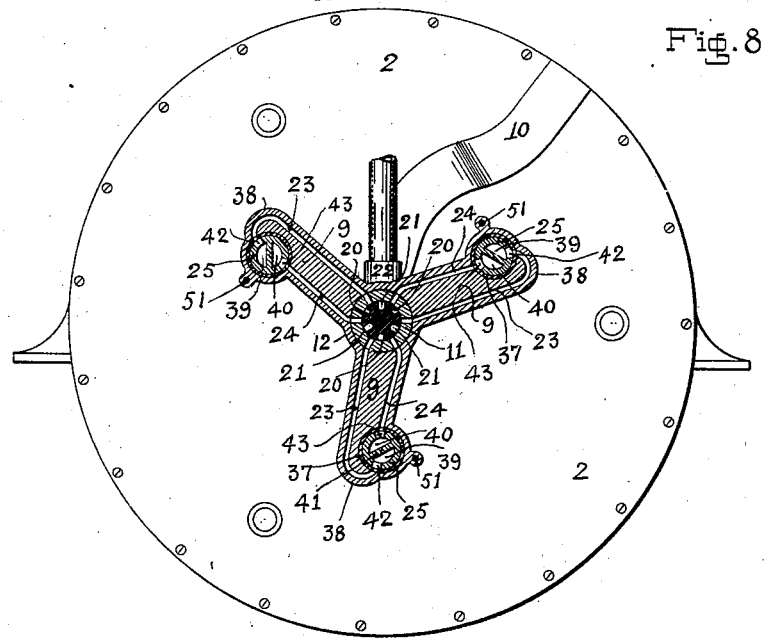

Figure 1 is a perspective view of my improved motor, showing portion of the casing broken away to expose the internal construction and arrangement. Fig. 2 is a perspective exterior view of the motor, showing the valve-controlling mechanism. Fig. 3 is a cross-section of a device for retaining the valve in position. Fig. 4 is a cross-section showing the plan of the group of cylinders. Fig. 5 is a sectional view showing one of the valves, a cylinder and piston, the rod and crank, and gear construction and connections; Fig. 6, a sectional view showing an adjustable means for taking up the wear of the piston-rod connection. Fig. 7 is a longitudinal section of the motor on line 7 7 of Fig. 4. Fig. 8 is a plan view of the motor in part section on line 8 8 of Fig. 7 through inlet and exhaust ports in connection with a reversing and automatic stop-valve. Fig. 9 is a plan view of the spring-operated stop and reversing-lever. Fig. 10 is a view of a detached part of the same. Fig. 11 is a longitudinal section of the same; Fig. 12, a side view, and Fig. 13 a face view, of part of the connecting-rod, showing means to take up the wear of the crank-pin bushings; and Figs. 14 and 15 are isometric views of the top and bottom bushings.

1 is the casing of the motor, and 2 the front plate, which is suitably secured to the same.

3 is the driving-shaft, which is journaled in the bearing 4, forming part of the casing, and in the bearing 5, forming part of the arm 6, which is secured to the casing.

7 is the driving-pulley, which is secured to the shaft 3.

8 is the annular gear, which is secured to the shaft 3 and located within the casing 1. The front plate 2 is provided with radially-extending bosses 9 and an exhaust passage-way 10, which extends outwardly to the edge of the plate from the point where the bosses 9 converge, as shown in Fig. 8.

As shown in Figs. 7 and 8, 11 is a cylindrical bushing having a tapered interior which is fitted into orifice 12 and is closed at the inner end, as shown in Fig. 7. 13 is a tapered valve-plug fitted within the bushing 11 and acting as a reversing-valve, which is provided with a central stem 14, extended through an orifice in the inner end of the bushing 11. Upon the end of the stem 14, which is threaded, spring-washers 15 are placed and held by a nut 16. These washers are designed to hold the valve-plug closely on its seat. The valve-plug 13 is provided with annular grooves or passage-ways 17 and 18, the annular groove 18 being opposite the exhaust passage-way 10.

20 represents longitudinal grooves extending inwardly in the plug, and 21 represents longitudinal grooves extending outwardly from the groove 18.

The annular groove 17 is in connection with supply-inlet 22, and the annular groove 18 is also in communication with the exhaust-passage 10, and said annular grooves 17 and 18 are also in open connection with the respective supply and exhaust grooves or passages 20 and 21, both sets being extended to over-reach or bridge the passage-ways 23 and 24, Figs. 7 and 8, in bushing 11 and the boss 9, leading to each cylinder-valve 25 in a manner presently described.

The plug-controlling valve 13 is provided with an outwardly-projecting stem 26, on the end of which is secured the double arm 27, which is connected by rods or cords 28 to any suitable operating device. (Shown in Figs. 2, 9, and 11.)

29 represents tubular receptacles connected by a central portion which is centrally pivoted in the face of the plate 2 by an inwardly-projecting pin 31, as shown in Figs. 10 and 11.

32 represents rods provided with end buttons 33, the rods extending through the holes in the ends of the receptacles 29.

34 is a laterally-projecting pin secured in the double arm 27 and projecting between the recessed ends of the rods 32.

35 represents spiral springs located in each of the receptacles 29 and extend between the button-shaped ends 33 of the rods 32 and the end plugs of the receptacles.

The double arm 27 is designed to be held centrally in the position shown in the drawings by means of the rods 32 and the spiral springs 35, and the rapidity of the action of the double arm may be increased or diminished as desired by the adjustment of the plugs 36, which are threaded and fit into corresponding threads in the interior of the receptacles 29. The double arm 27 when in its normal position is arranged to shut off all the connecting-ports between the valve-plug 13 and the cylinders, as shown in Figs. 8 and 9.

The valve-plugs 25 are tapered, as shown in Figs. 1, 5, and 7, the narrow portion of the taper being at the outer end, and such plugs fit within the bushing 37.

The bushings 37 and valve-plugs 25 extend through the part 38 of the bosses 9 on plate 2.

39 and 40 are ports extending through the valve-plugs 25, separated by a central partition 41, and are in register by ports 42 and 43 with the passage-ways 23 and 24.

44 and 45, Figs. 6 and 7, are ports in the valve-plug 25 near the inner end, and 46 and 47 are ports in the ends of the power-cylinders, which are designed to register with the ports 44 and 45 alternately by the oscillation of the cylinders, as will hereinafter appear.

The valve-plugs 25, Figs. 1 and 5, extend beyond the bushings 37 and are held from turning by the keys 49 and set-screws 48, which extend through the collar 50, which is secured by the screw-pin 51 to the boss 9, so as to hold such collar from turning. The outer ends of the valve-plugs are provided with nuts 52, as indicated in Fig. 5, which are designed to take up the wear of the valve-plugs 25.

53 represents the power-cylinders, provided with extended heads 54, having central holes tapered so as to fit onto the valve-plugs 25.

55 represents the pistons of the respective cylinders 53, which are connected by a piston-rod 56 to pin 57 on the crank-wheel 58, which is secured on the hollow shaft 59, which is journaled at one end in the plate 2 and at the other end in the bracket 60, as shown in Figs. 1 and 5.

61 represents pinions secured on the end of the shaft 59 and meshing with the annular gear-ring 8.

To obtain a uniform momentum, the crank-pins are arranged at proper relative positions, and apertures 64 are provided through which the gear-pinions 61 may be passed in assembling or removing the same, as shown in Fig. 5. The crank-disks 58 and pin 57 are divided in the center at 66, so that the sections can be readily removed, as shown in Fig. 5.

In Fig. 7 a bolt 68 is shown extending through the hollow power-shaft 3, the ends of the bolt having a right-angular arm 69 of rectangular cross-section, which fits into a groove or recess in the hub of the surrounding gear 8, thereby securing the same to shaft 3.

In Figs. 12, 13, 14, and 15 enlarged details of the crank-pin bearing are shown, the strap 70, that holds the brasses 72 and the head of the connecting-rod 56, being adapted to contain an adjusting device for taking up the wear of the brasses.

In the construction shown space is provided between the brasses 71 72, and the inner section 71 has a projecting post 74, that bears upon a screw-bolt 75, operated by a capstan-collar 76. This collar is pinned to the bolt 75 at 77 and is serrated or notched on its periphery and held in position by the plate 78 engaging therewith.

62, Fig. 5, is a bar connected to the periphery of the annular gear-rim and provided with a cotton-batting swab 63. As the casing has a certain amount of oil placed in it, it will readily be seen that the swab will carry the oil around and keep the crank wheel and gear properly lubricated.

Having now referred to the essential details involved in the motor, I will briefly describe its operation.

By vibrating or pulling down the right side of the double arm 27 the reversing and controlling valve 13 is rotated so as to bring the ports or passage-ways 20 and 21 opposite the passage-ways 23 and 24 in the bushing 11 and the passage-ways 23 and 24 in the boss 9. The fluid-pressure consequently passes through ports 20 and the passage-ways 23, ports 42 and 39 of the valve-plug 25, thence through the valve-plug by the port 44 and 46 into the interior of the power-cylinder, forcing the piston outwardly, and as the piston is forced outwardly it necessarily turns the connected crank and oscillates at the same time, thereby acting when the piston has reached the limit of its stroke to open the exhaust passage-way through the ports 47 and 45 and through port 40 of the valve-plug 25 and out through the port 43, passage-ways 24, and grooves 21 and 18 into exhaust passage-way 10. It will thus be seen that the reciprocation of the pistons and oscillation of the cylinders is produced by the fluid-pressure through the ports, as hereinbefore described, and consequently the pinions 61 are driven and which in turn drive the annular gear, and consequently the shaft 3 and pulley 7. By manipulating the double arm 27 in the opposite direction the pressure is conducted through the passage-ways 20 and 24 into port 40, Fig. 8, and corresponding passage-ways 45 and 47 to the piston shown in Figs. 4 and 7 and then back through the passage-way 46 and 44, or in just the reverse direction to that before described, giving opposite direction to the rotation of the shaft. It will thus be seen that the motor may be readily reversed. As soon as the double arm 27 is released it is forced back into its normal position by the rods 32, operated as hereinbefore described, and consequently the pressure will be immediately cut off. It will be seen that the motor will operate only so long as the double arm 27 is held out of its normal position, and when the arm is released the operation of the motor is immediately arrested.

It will be observed that in my invention the casing is fastened to a suitable support and remains stationary, thereby dispensing with the bearings, which are necessary in a type of motor wherein the pistons rotate around the shaft.

In the construction shown I am able to place the controlling-valve centrally and inclose all the operative parts within the casing, and thereby produce a compact machine of this type, having all its operative parts inclosed and protected and at the same time accessible for examination and repair.

Although three cylinders are shown, it will be readily understood that more than this number can be employed, according to the size of the annular gear, in which case, of course, the ports would be increased in the controlling-valve according to the number of cylinders used.

The controlling operating mechanism herein shown and described is not claimed in this application, as it forms an independent subject of invention, which will be presented in a separate application in accordance with the rules of practice provided in such cases.

Having thus fully described my invention, what I claim, and desire to secure by Letters Patent, is—

A motor, comprising a group of oscillating power-cylinders with connected power-transmitting devices mounted upon a stationary support all arranged within a surrounding and coöperating rotating frame, combined with means for transmitting the power to an operating-shaft and valve devices for regulating the motive fluid, as set forth.

Signed at New York city, in the county of New York and State of New York, this 20th day of December, A. D. 1902.

THOMAS BARROW.

Witnesses:
CHAS. W. FORBES,
CHARLES HANIMANN.